3,336,286
5-NITRO-2-THIAZOLE-3'-AMINO ARYLCARBONYL AND ARYLSULFONYL ANILIDE AZO DYES
Mario F. Sartori, Wilmington, Del., assignor to E. I. du Pont de Nemours and Company, Wilmington, Del., a corporation of Delaware
No Drawing. Filed June 25, 1964, Ser. No. 378,072
9 Claims. (Cl. 260—158)

This invention relates to novel disperse monoazo dyes and more particularly to non-subliming monoazo dyes useful in the dyeing of textiles.

The present dyes are prepared by coupling the diazo of 2-amino-5-nitrothiazole to a 3'-amino-acid anilide compound in which the acid radical is an arylcarbonyl or arylsulfonyl radical. Dyes of this general type are disclosed in United States Patent 2,746,953. In the prior art dyes, however, the coupling components are 3'-amino acid anilides in which the acid radical is a short chain alkyl carbonyl radical, i.e., —CO-alkyl, in which the alkyl group has 1 to 3 C-atoms. The known dyes are used for coloring textile materials of cellulose esters, wool, nylon, silk, polyethylene-terephthalate or polyacrylonitrile.

It is an object of this invention to provide new monoazo compounds. Another object is to provide disperse dyes which when applied to hydrophobic fibers are essentially non-subliming at temperatures up to at least 400° F. (204° C.). These and other objects will become apparent in the following description and claims.

Since high temperatures are frequently encountered during textile treatments and in hot pressing operations, subliming dyes are not desirable. Likewise, dyes which sublime are not suitable for use in dry-heat methods of dye application such as described in United States Patent 2,663,612 in which the dyes are fixed at high temperature. Dyes which sublime are objectionable in the trade for at least two reasons: (a) loss of color strength from the dyed fabric and (b) staining of adjacent fabrics which may be white or dyed in different hue.

More specifically, the present invention is directed to disperse azo dyes of the formula:

(I)

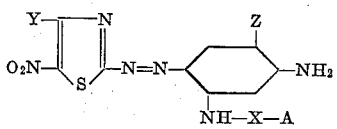

wherein A is a member selected from the group consisting of an aromatic monocyclic ring and an aromatic dicyclic ring; wherein A may be substituted with non-ionic groups; X is a member selected from the group consisting of —CO— and —SO$_2$—; Y is a member selected from the group consisting of H and CH$_3$; and Z is a member selected from the group consisting of H, Cl, CH$_3$, OCH$_3$ and OC$_2$H$_5$.

Preferred embodiments of the present invention include the disperse azo dye of the formula:

(II)

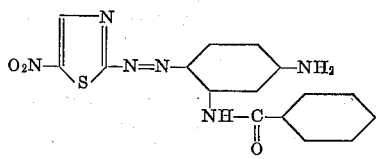

the disperse azo dye of the formula:

(III)

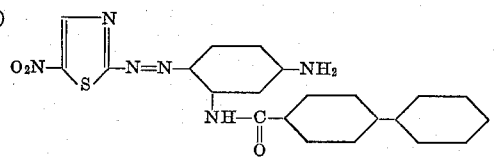

and the disperse azo dyes of the generic Formula I wherein —X—A is

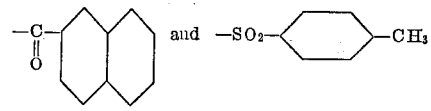

These dyes possess excellent sublimation fastness and good general fastness properties. Generally, they exhibit good buildup on polyester fibers when applied either by dry-heat or carrier methods known in the art. The following representative examples illustrate the compounds of the present invention and their utility as non-subliming dyes. Parts mentioned are by weight.

Example 1

Nitrosylsulfuric acid is prepared by adding 7.0 parts (0.1 mole) of sodium nitrite to 50 parts of concentrated sulfuric acid, while stirring and keeping the temperature between 25° C. and 35° C. Stirring is continued until a clear solution is formed. To the obtained solution, cooled to 5° C., is added a mixture of 85 parts of acetic acid and 15 parts of propionic acid, while stirring, and the temperature is allowed to rise to 15° C. The mixture is then cooled to 0° C. ± 2° C., and 14.5 parts (0.1 mole) of 2-amino-5-nitrothiazole are added portionwise, in about 15 minutes, followed by the addition of 100 parts of a mixture of acetic acid and propionic acid as above, while keeping the temperature at 0° C. to 5° C. The mixture is then stirred at this temperature for three hours. An excess of nitrous acid is maintained during this time and is then removed by the addition of urea. This diazo solution is then added during about one-half hour to a stirred solution of 21.2 parts of 3'-aminobenzanilide in 50 parts of a mixture of acetic acid and propionic acid as above, while keeping the temperature at 0° to 2° C.

After stirring at this temperature for one hour, sodium acetate is added to raise the pH of the reaction mixture to 4. The agitation is continued for an additional one hour, then cold water is added to precipitate the dye, which is filtered off, washed acid-free and dried. The new dye is a dark violet powder and has the formula

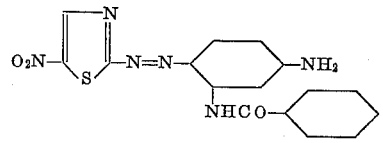

The absorption maximum of this dye in o-dichlorobenzene is located at 540 millimicrons and its molar extinction coefficient is 23,500.

A fabric of "Dacron" polyester fiber dyed with the new dye has a violet shade of high tinctorial value, good light fastness and outstanding sublimation fastness. For instance, a 1% dyeing on "Dacron" polyester fabric does not stain a white fabric in contact with the dyed fiber until the temperature exceeds 400° F. (204° C.). In a controlled sublimation test, using the above structure in which the benzoyl radical is replaced by acetyl, the staining begins at 369° F. (187° C.).

When the 2-amino-5-nitrothiazole of the present example is replaced by a chemically equivalent amount of 2-amino-4-methyl-5-nitrothiazole, a dye having similar properties is obtained.

By substituting chemically equivalent amounts of the following compounds, 3'-amino-2-chlorobenzanilide, 3'-amino-3-chlorobenzanilide, 3'-amino-4-chlorobenzanilide, 3'-amino-2-bromobenzanilide, 3'-amino-3-bromobenzanilide, 3'-amino-4-bromobenzanilide, 3'-amino-o-toluanilide, 3'-amino-m-toluanilide, 3'-amino-p-toluanilide, 3'-amino-2-cyanobenzanilide, 3'-amino-3-cyanobenzanilide;

3'-amino-4-cyanobenzanilide, 3'-amino-m-anisanilide, 3'-amino-p-anisanilide, 3'-amino-2-ethoxybenzanilide, 3'-amino-3-ethoxybenzanilide, 3'-amino-4-ethoxybenzanilide and 3'amino-4-butylbenzanilide, for the 3'-aminobenzanilide of this example, other dyes having similar properties are also obtained.

*Example 2*

2.9 parts of 2-amino-5-nitrothiazole are diazotized in nitrosylsulfuric acid, and coupled to 4.85 parts 3'-amino-o-anisanilide in a mixture of acetic and propionic acid, and the resulting azo dye is isolated according to the procedure described in Example 1. The new dye, obtained as a dark violet powder, has the formula

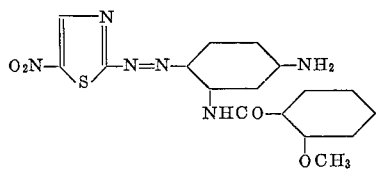

The absorption maximum of this dye in acetone is located at 560 millimicrons. It dyes polyethylene terephthalate fiber in gray-violet shades of good light and sublimation fastness.

Violet dyes with similar properties are obtained when in this example the 3'-amino-o-anisanilide is replaced by a chemically equivalent amount of either 3'-amino-4-nitrobenzanilide or 3'-amino-4'-methylbenzanilide.

*Example 3*

5.1 parts of 2-amino-5-nitrothiazole are diazotized, and coupled to 9.3 parts of 3'-amino-2-naphthanilide in acetic and propionic acid and the resulting azo dye is isolated according to the procedure described in Example I. The new dye has the formula

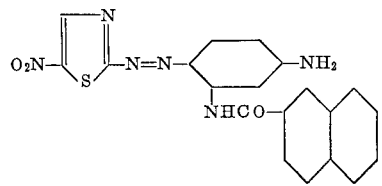

The absorption maximum of this dye in o-dichlorobenzene is located at 542 millimicrons and its molar extinction coefficient in this solvent is 18,000. It dyes "Dacron" polyester fiber in violent shades of outstanding sublimation fastness. A similar dye is obtained when 3'-amino-1-naphthanilide is empolyed as a coupler in place of 3'-amino-2-naphthanilide.

*Example 4*

7.25 parts of 2-amino-5-nitrothiazole are diazotized, and coupled to 14.6 parts of 3''-amino-4-biphenylcarboxanilide in acetic and propionic acid and the resulting azo dye is isolated according to the procedure described in Example 1. The new dye has the formula

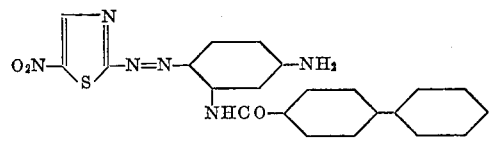

The absorption maximum of this dye is o-dichlorobenzene is located at 540 millimicrons and the molar extinction coefficient in dimethylformamide is 35,000. The 3''-amino-4-biphenylcarboxanilide of this example may be replaced by chemically equivalent amounts of the following coupler:

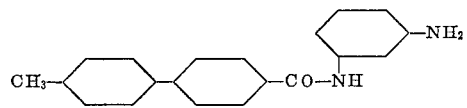

which is 3'' - amino - 4' - methyl - 4 - biphenylcarboxanilide or by 3'' - amino - 2' - methyl - 4 - biphenylcarboxanilide, 3'' - amino - 4' - methoxy - 4 - biphenylcarboxanilide, or 3'' - amino - 4' - chloro - 4 - biphenylcarboxanilide which give dyes having similar properties.

*Example 5*

7.25 parts of 2 - amino - 5 - nitrothiazole are diazotized, and coupled to 13.3 parts of 3'-amino-p-toluenesulfonanilide in acetic and propionic acid and the resulting azo dye is isolated according to the procedure described in Example 1. The new dye has the formula

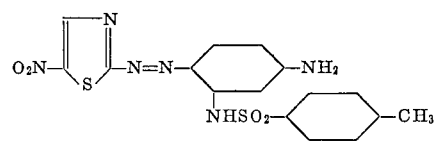

The absorption maximum of this dye in o-dichlorobenzene is located at 528 millimicrons. It dyes "Dacron" polyester fiber in gray-violet shades of very good sublimation fastness.

Similar dyes are obtained when the coupler 3'-amino-p-toluenesulfonanilide is replaced by a chemically equivalent amount of one of the couplers 3'-amino-2-naphthalenesulfonanilide of 3' - amino - 1 - naphthalenesulfonanilide.

In all the above examples, the diazo components of the novel days of this invention, namely, 2-amino-5-nitrothiazole and 2-amino-4-methyl-5-nitrothiazole may be used interchangeably. The coupling components disclosed herein may also be used interchangeably throughout, and 3' - amino - 4' - chlorobenzanilide, 3' - amino - p - benzophenetidide and 3'-amino-p-toluenesulfon-p-anisidide may also be used as couplers. These various diazo components and coupling components provide similar disperse azo dyes having excellent sublimation fastness and good general fastness properties.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. The disperse azo dyes of the formula:

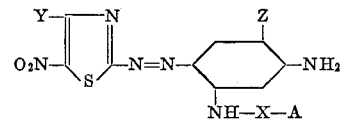

wherein A is a member selected from the group consisting of an aryl monocyclic ring and an aryl dicyclic ring; wherein A may be substituted with a nonionic group selected from the class consisting of methyl, butyl, methoxy, ethoxy, chlorine, bromine, cyano, nitro, phenyl, tolyl, anisyl and chlorophenyl; X is a member selected from the group consisting of —CO— and —SO$_2$—; Y is a member selected from the group consisting of H and CH$_3$; and Z is a member selected from the group consisting of H, Cl, CH$_3$, OCH$_3$ and OC$_2$H$_5$.

2. The disperse azo dyes of claim 1 in which A is phenyl.

3. The disperse azo dyes of claim 1 in which A is

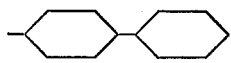

4. The disperse azo dyes of claim 1 in which A is naphthyl.

5. The disperse azo dyes of claim 1 in which A is tolyl.

6. The disperse azo dye of the formula:

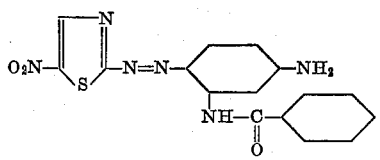

7. The disperse azo dye of the formula:

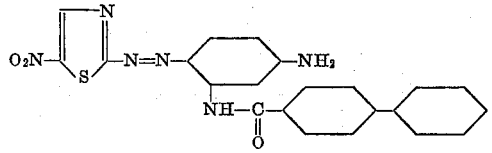

8. A disperse azo dye of claim 1 having the formula

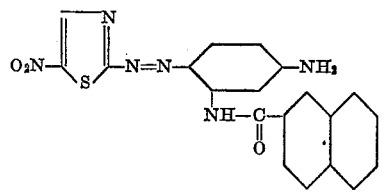

9. A disperse azo dye of claim 1 having the formula

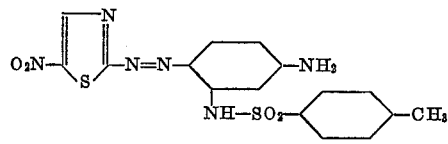

References Cited

UNITED STATES PATENTS 2,746,953   5/1956   Dickey et al. _____ 260—158
3,096,318   7/1963   Straley et al. _____ 260—158 X CHARLES B. PARKER, *Primary Examiner.*

F. HIGEL, *Assistant Examiner.*